(12) United States Patent
Ramos

(10) Patent No.: US 7,914,177 B2
(45) Date of Patent: *Mar. 29, 2011

(54) PROPHYLAXIC/THERAPEUTIC VEHICLE FILTER COMPONENT FOR HEALTHY EYES, PSEUDOAPHAKIC EYES OR EYES SUFFERING NEURODEGENERATION

(75) Inventor: Celia Sanchez Ramos, Madrid (ES)

(73) Assignee: Universidad Complutense de Madrid, Madrid (ES)

( * ) Notice: Subject to any disclaimer, the term of this patent is extended or adjusted under 35 U.S.C. 154(b) by 502 days.

This patent is subject to a terminal disclaimer.

(21) Appl. No.: 11/970,157

(22) Filed: Jan. 7, 2008

(65) Prior Publication Data

US 2008/0186607 A1 Aug. 7, 2008

Related U.S. Application Data

(63) Continuation-in-part of application No. 11/936,464, filed on Nov. 7, 2007.

(60) Provisional application No. 60/864,696, filed on Nov. 7, 2006, provisional application No. 60/884,425, filed on Jan. 11, 2007.

(51) Int. Cl.
*F21V 9/00* (2006.01)

(52) U.S. Cl. ........ 362/293; 362/583; 362/260; 252/586; 428/38; 428/426

(58) Field of Classification Search ............... 362/583, 362/293, 260; 259/885; 252/586; 428/38, 428/426; 296/84.1, 97.1; 156/99, 344
See application file for complete search history.

(56) References Cited

U.S. PATENT DOCUMENTS

| 3,873,185 | A | * | 3/1975 | Rogers ..................... 359/275 |
| 4,715,704 | A | | 12/1987 | Biber et al. |
| 4,936,673 | A | | 6/1990 | Mauersberger |
| 4,952,046 | A | * | 8/1990 | Stephens et al. .......... 351/163 |
| 5,036,440 | A | * | 7/1991 | Takii et al. ................ 362/95 |
| 5,121,030 | A | | 6/1992 | Schott |
| 5,774,202 | A | | 6/1998 | Abraham et al. |
| 6,158,865 | A | | 12/2000 | Kreutzig |
| 6,252,702 | B1 | | 6/2001 | Cook et al. |
| 6,299,310 | B1 | | 10/2001 | Reis |
| 6,315,411 | B1 | * | 11/2001 | Hatchiguian ............. 351/163 |

(Continued)

FOREIGN PATENT DOCUMENTS

DE G 88 08 871.5 10/1988

(Continued)

OTHER PUBLICATIONS

Catherine A. McCarty, PHD. MPH et al., "Risk Factors for Age-Related Maculopathy The Visual Impairment Project", Arch Ophthalmol/vol. 119, Oct. 2001, pp. 1455-1462.

(Continued)

*Primary Examiner* — Sandra L O Shea
*Assistant Examiner* — Jessica L McMillan
(74) *Attorney, Agent, or Firm* — Schiff Hardin LLP

(57) ABSTRACT

A component with a yellow pigment that absorbs light wavelengths in the range 500 to 380 nm is provided for transparent or translucent components of a vehicle in order to protect healthy eyes, pseudoaphakic eyes, and eyes with macular and retinal degeneration from harmful ultraviolet rays. The component may be in the form of a filter that is applied on or within these transparent or translucent components of the vehicle.

16 Claims, 1 Drawing Sheet

U.S. PATENT DOCUMENTS

| | | |
|---|---|---|
| 6,893,127 B2 | 5/2005 | Reichow et al. |
| 2002/0113941 A1 | 8/2002 | Bees |
| 2004/0075810 A1 | 4/2004 | Duha et al. |
| 2006/0195278 A1 | 8/2006 | Lianza |

FOREIGN PATENT DOCUMENTS

| | | |
|---|---|---|
| DE | 10259261 | 7/2004 |
| ES | 1046793 U | 2/2001 |
| FR | 2811089 | 1/2002 |
| GB | 2 368 446 | 5/2002 |
| IT | 1147092 | 11/1986 |
| JP | 58049514 | 3/1983 |
| JP | 59126935 | 7/1984 |
| JP | 61087106 | 5/1986 |
| JP | 5193397 | 8/1993 |
| JP | 10020347 | 1/1998 |
| JP | 10315763 | 12/1998 |
| JP | 2000349541 | 12/2000 |
| JP | 2000349542 | 12/2000 |
| KR | 920005420 | 7/1992 |
| WO | WO 99/27397 | 6/1999 |
| WO | WO 2005/025575 | 3/2005 |

OTHER PUBLICATIONS

Ellen E. Freeman, MSc et al., "Is There an Association Between Cataract Surgergy and Age-Related Macular Degeneration? Data From Three Population-based Studies", 2003 By Elsevier Inc., pp. 849-856.

J. J. Wang et al., "Cataract and age-related maculopathy: the Blue Mountains Eye Study", Ophthalmic Epidemiology-1999, vol. 6, No. 4, pp. 317-326.

Ronald Klein, MD, MPH et al., "The Association of Cataract and Cataract Surgery With the Long-term Incidence of Age-Related Maculopathy", Arch Ophthalmoul/ col. 120, Nov. 2002, pp. 1551-1558.

* cited by examiner

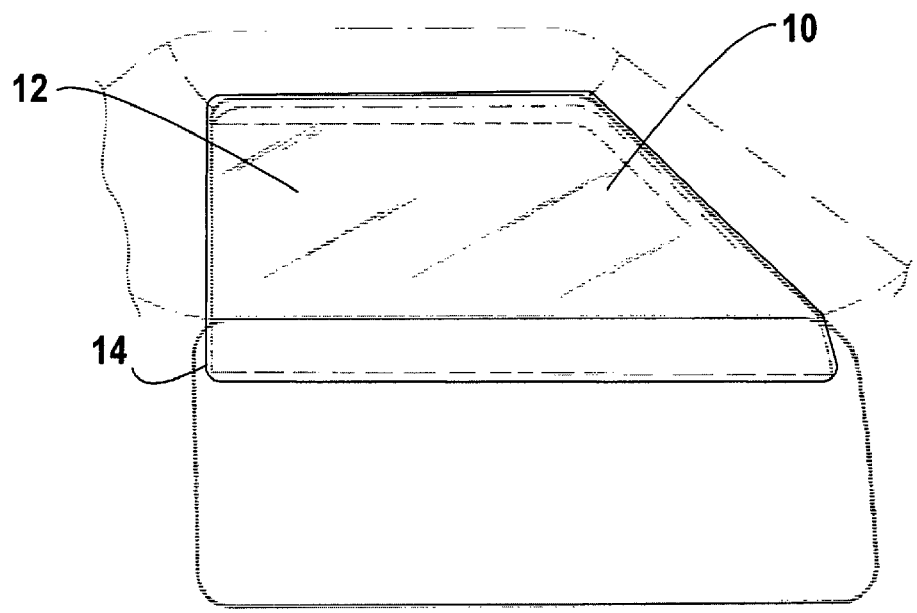
FIG. 1
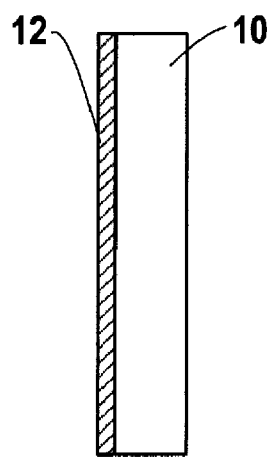 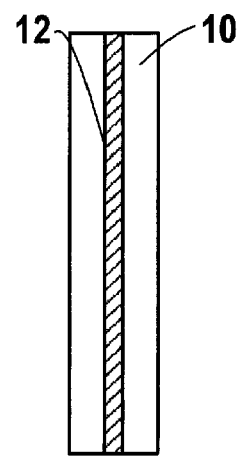 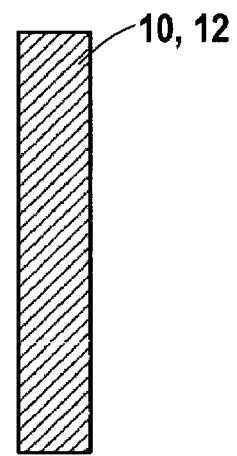
FIG. 2A  FIG. 2B  FIG. 2C

PROPHYLAXIC/THERAPEUTIC VEHICLE FILTER COMPONENT FOR HEALTHY EYES, PSEUDOAPHAKIC EYES OR EYES SUFFERING NEURODEGENERATION

CROSS-REFERENCE TO RELATED APPLICATIONS

This application is a continuation-in-part of parent application Ser. No. 11/936,464, filed Nov. 7, 2007, which claims the benefit of provisional application No. 60/864,696, filed Nov. 7, 2006. This application also claims the benefit of provisional application No. 60/884,425, filed Jan. 11, 2007. These applications are herein incorporated by reference.

BACKGROUND

The invention is intended for the opthalmology sector of the market, within the area of optical applications of a therapeutic and/or prophylactic nature.

The object of this invention is a transparent filtering vehicle component for the protection of healthy eyes, pseudophakic eyes (eyes that have undergone cataract surgery) and/or eyes with macular and retinal degeneration, from short wavelengths of light. It is produced by applying a filter comprising a yellow pigment to the transparent or translucent surface/s of vehicles to protect eyes from the short wavelengths of the visible spectrum (500 to 380 nm). As an example, this component could be applied to windshields, or windscreens, of cars, buses, trains, planes, and other vehicles.

Visual perception is the result of the response to visible radiation in the wavelength range 380-760 nm. In the environment, solar radiation is the main risk factor for vision. The sun emits UV rays and IR radiation, which are mainly absorbed by the atmosphere. When the solar radiation transmitted through the atmosphere reaches the Earth's surface, it consists of UV-B rays (230-300 nm), UV or UV-A rays (300-380 nm), visible light rays (380-760 nm) and IR rays (760-1400 nm). Healthy human eyes freely transmit IR rays and those of most of the visible spectrum to the retina, but the cornea and crystalline lens prevent the most reactive wavelengths of the visible spectrum (UV-B rays and the blue portion of the spectrum) from reaching the retina.

The human crystalline lens changes its transmission properties as it ages by intensifying its yellow color thus increasing its capacity to filter out UV and blue light rays. Hence, in persons older than 65 years, ultraviolet light (<400 nm) is not transmitted and the transmission of blue light (400-500 nm) is markedly reduced.

The retina is capable of protecting itself from short wavelengths of light in two ways: through its uneven distribution of photoreceptors, such that there are no photoreceptors sensitive to blue light in the macular depression; and through the actions of yellow pigments in this zone, which also exert a protective effect.

These natural protection systems the human eye has against the shorter wavelengths of light—the crystalline lens and structures of the retina—can be seriously affected by certain diseases and/or surgical procedures: cataracts, whose surgical treatment involves the removal of the crystalline lens; additionally, it is common to find a pathological aging ageing process that causes degradation of the retinal structures producing age-related macular degeneration (AMD).

Both cataracts and AMD can coexist in persons older than 65 years. In this population of elderly subjects, cataracts are the main cause of vision loss and AMD is the main cause of blindness. In addition, an increase in both these diseases can be expected due, among other factors, to increased life expectancy. This translates into a great interest in these diseases and their treatment options in the research field and optics industry.

Several epidemiological studies have evaluated the relationship between cataract surgery and AMD. Thus, Klein (Klein R, Klein B E, Wong T Y, Tomany S C, Cruickshanks K J. The association of cataract and cataract surgery with the long-term incidence of age-related maculopathy. Arch Opthalmol 120:1551-1558. 2002) and Freeman (Freeman E, Muñoz B, West S K, Tielsch J M, Schein O D. Is there an association between cataract surgery and age-related macular degeneration? Am J Opthalmol 135 (6): 849-856. 2003) claim there is a higher risk of developing symptoms of AMD in persons who have undergone cataract surgery.

However, in earlier investigations by Wang (Wang J J, Mitchell P, Cumming R G, Lim R. Cataract and age-related maculopathy: the Blue Mountains Eye Study. Ophthalmic Epidemiol 6: 317-326.1999) and McCarty (McCarty C A, Mukesh B N, Fu C L, Mitchell P, Wang J J, Taylor H R. Risks factors for age-related maculopathy: the Visual Impairment Project. Arch Opthalmol 119:1455-1462. 2001) this hypothesis was rejected, possibly because of the less developed technology used for their diagnostic measurements. Techniques such as optical coherence tomography that allow the accurate, rapid, and non-invasive follow up of retinal neurodegeneration processes have only recently been introduced. These techniques are essential for monitoring the determining effect of the natural pigments that absorb harmful radiations.

Several techniques have also been developed to protect eyes subjected to cataract surgery from short wavelengths of light.

There are several types of filters containing a yellow pigment on the market, yet there is no optimal procedure and/or device to apply these filters to the human eye as a preventive and/or therapeutic measure to replace and/or improve the eye's natural protection.

Since the mid-1990s, eyes undergoing cataract extraction have been implanted with intraocular lenses containing a yellow pigment to act as a filter. This option requires surgical intervention with all its associated risks and difficulties. There is also a large population of subjects who have been implanted with a transparent lens to replace the natural lens during cataract surgery who are therefore devoid of the necessary protection. In these patients, the artificial crystalline lens, lacking a yellow pigment, needs to be complemented with a system to support the yellow pigment such as the vehicle component that is the object of the present invention.

Several patents related to the state of this technique have been developed (for healthy, pseudoaphakic and/or neurodegenerating eyes) although they differ considerably from the object of the present invention:

Solar visors for a vehicle windscreen (Korean patent document no. 9 205 420 B) comprised of polarized filters, among other components.

Windscreen photodetector (Japanese patent document no. 5 912 6935) to improve visibility in a vehicle.

Motorcar windscreen (Japanese patent document no. 5 804 9514) that prevents direct sunlight entering the eyes without narrowing the field of vision through the use of coloured sections.

Indicator for vehicles that prevents double images (Japanese patent document no. 5 193 397).

Vision system for the outside mirror of a vehicle (Japanese patent document no. 1 031 5763) that avoids glare due to vehicles in the rear.

Image emission system with a reduced emission angle (French patent document no. 2 811 089) that avoids reflections for use in aeroplane cockpits.

Phosphate glass containing copper for use in aeroplane cockpits (U.S. Pat. No. 6,252,702). This glass attenuates infrared radiation avoiding the risk of temporary blindness in the pilot without limiting visibility.

Optical media and procedure for improving or modifying colour vision and method for preparing them (U.S. Pat. No. 5,774,202) using a colour filter with a specific transmission range. For use on any type of surface including glass.

Visual discerning filter (Japanese patent document no. 6 108 7106) to avoid the change in luminosity that follows a change in tone and reduce the eye effort by providing the maximum absorption possible.

Ultraviolet filter and glass comprised of this filter (Japanese patent document no. 1 002 0347), whose transmittance of this type of radiation is variable and adjustable.

Electromagnetic filter (Japanese patent document no. 2000 349542 and 2000 349541) that protects against certain magnetic frequencies received, for example, through windows.

Absorption filter for color exposure systems (U.S. Pat. No. 5,121,030) that, through the application of dyes, improves visibility in conditions of high luminous intensity.

Colour highlighting filter and method of use to improve human vision (U.S. Pat. No. 6,158,865). Various embodiments of the invention comprises a filter that improves vision in all light environments including extreme ambient light and low illumination levels, and incorporates an adapting ring for the filter.

Special optical filters for certain activities and optical accessories that use these filters (U.S. Pat. No. 6,893,127) to improve the visualization of objects, for example in sports activities.

These devices differ from various embodiments of the present invention mainly in their purpose and utility since none has been designed as a prevention/protection device for eyes against the harmful effects of short wavelengths of light. Moreover, most of these patents do not refer to the application of a filter to the transparent surface/s of vehicles rather they are designed as other formats (e.g. specific light systems or solutions).

SUMMARY

The present invention is directed to a component for protecting eyes against short wavelengths of light. In various embodiments of the invention, the component comprises a filter adapted for placement on or inclusion in a transparent or translucent element of a vehicle, the filter containing a yellow pigment that absorbs wavelengths in the range 500 to 380 nm. The filter may be included within the transparent or translucent element of the vehicle or placed on a surface of the transparent or translucent surface of the vehicle. The vehicle element may be the glass used in motor cars, buses, trains, planes, or other transport vehicles. In a preferred embodiment, the filter is transparent so as not to interfere with the viewing through the vehicle element.

An embodiment of the invention may be a therapeutic or prophylactic component for protecting eyes. A plurality of filter components may be applied to a plurality of transparent or translucent surfaces of a vehicle.

The invention may also be construed as a method for protecting eyes against short wavelengths of light, comprising: creating a filter material containing a yellow pigment that absorbs wavelengths in the range 500 to 380 nm; and applying the filter material to one or more transparent or translucent surfaces of a vehicle. The method may further comprise applying the filter material to a filter element; and applying the filter element to the one or more transparent or translucent surfaces of the vehicle. The apparatus and method may be used where the eyes are either healthy eyes, pseudophakic eyes, or eyes with macular and retinal degeneration.

In a preferred embodiment, a prophylaxic/therapeutic vehicle windscreen component for healthy eyes, pseudoaphakic eyes or eyes suffering neurodegeneration is provided. The object of the invention is to provide a filtering, transparent component with preventive effects on healthy eyes and therapeutic and prophylactic effects on eyes with pseudoaphakia and/or macular and retinal degeneration in terms of protecting them from short wavelengths of the visible spectrum (500 to 380 nm). The component is the result of applying a filter containing a yellow pigment to the transparent or translucent surfaces of a vehicle in which the subject may be found. Through the simple application of a filter to any of the transparent or translucent surface/s of any vehicle in which the subject may be found, embodiments of the invention protect the eye from absorbing the short wavelengths of the visible spectrum. Embodiments of the invention comprise the combination of the transparent or translucent surface(s) of any vehicle and a yellow filter that absorbs short wavelengths of light from 500 to 380 nm.

The objective of the invention is the prevention and protection of eyes against the absorption of blue and ultra violet light by applying a filter to the transparent or translucent surface(s) of a motor vehicle. As mentioned, it is particularly useful in the case of pseudoaphakic subjects, to functionally compensate for the removal of protective pigments (along with the natural lens during surgery) and in the case of neurodegeneration processes to potentiate the prophylactic effect (processes that often coexist in elderly persons), but is equally important for the protection of healthy eyes in subjects of any age.

DESCRIPTION OF THE DRAWINGS

The invention is described with respect to various preferred embodiments illustrated in the drawings and described in more detail below.

FIG. 1 is a pictorial view of a vehicle windows comprising a filter and frame;

FIG. 2A is a cross-sectional view of a window having a filter applied to an outer surface;

FIG. 2B is a cross-sectional view of a window having a filter applied inside of the window; and FIG. 2C is a cross-sectional view of a window having integrated filter material.

DETAILED DESCRIPTION OF THE PREFERRED EMBODIMENTS

FIG. 1 illustrates a basic preferred embodiment of the invention. In FIG. 1, the filter material 12 is applied to a window 10 of a vehicle door. Various embodiments of the invention can be implemented by applying a yellow filter, filter material, or filter component 12 that absorbs short wavelengths of light from 500 to 380 nm to or within the transparent or translucent surface(s) 10 of a motor vehicle, in which a person might be present. As an example, the component 12 could be applied to or within the windshields, or windscreens, 10 of automobiles, buses, trains, planes or any other transport vehicle.

FIG. 2A illustrates an embodiment in which the filter 12 is a film applied to a surface of a window 10. However, the window or other transparent/translucent component could be manufactured as a layered component (FIG. 2B) in which the filter 12 is a film that is sandwiched between two outer layers of the window 10. Finally, the filter 12 may be integrated into the window material 10, as is illustrated in FIG. 2C.

Various embodiments of the invention thus may include utilization in any transparent or translucent surface(s) of any type of vehicle in which people travel (motor cars, buses, trains, airplanes, etc.). In order to hold the filter 12 in place, a frame, device, or support 14 may be utilized to apply and/or hold the filter to the transparent surface. The filter 12 itself may be a yellow filter, among those available on the market, compatible with the surface material to which it is applied, that absorbs short wavelengths of light from 500 to 380 nm. Ideally, the filter material is applied across all of the surface's light transmitting area.

In an exemplary embodiment, yellow filter material 12 is selected from those commercially available, for instance, in the form of a screen or dye that is compatible with the material or surface of the material 10 to which it will be applied.

A support material, when used as a carrier of the yellow filter material 12, can be selected from those available on the market to in order to apply the filter 12 to the vehicle's transparent/translucent surfaces 10 according to the manufacturers' instructions. The filters 12 can be pre-cut to fit specific windows on specific models, or can be of various standardized sizes that must be trimmed. When the filter 12 does not comprise a backing carrier, it can be applied by spraying, painting, or other suitable mechanism. Ideally, the yellow filter is mounted on the support such that it covers all the light-transmitting area.

In summary, by applying a yellow filter to the transparent or translucent surface/s of the vehicle in which the subject may be found, any person will be able to protect his/her healthy eyes from short-wavelengths of light. In patients who have undergone cataract surgery with the implant of an intraocular lens, various embodiments of the invention will compensate for the lack of protection of the operated eye and in eyes suffering neurodegenerative processes it will improve and increase their natural protection. This simple precaution will avoid the problems related to the technical options available on the market (filters with no application device and intraocular lenses).

For the purposes of promoting an understanding of the principles of the invention, reference has been made to the preferred embodiments illustrated in the drawing, and specific language has been used to describe these embodiments. However, no limitation of the scope of the invention is intended by this specific language, and the invention should be construed to encompass all embodiments that would normally occur to one of ordinary skill in the art. Moreover, no item or component is essential to the practice of the invention unless the element is specifically described as "essential" or "critical". The word mechanism is intended to be used generally and is not limited solely to mechanical embodiments. Numerous modifications and adaptations will be readily apparent to those skilled in this art without departing from the spirit and scope of the present invention.

What is claimed is:

1. A component for protecting eyes against short wavelengths of light, comprising:
    a filter adapted for placement on or inclusion in a transparent or translucent element of a vehicle, the filter containing a yellow pigment that absorbs wavelengths in the range 500 to 380 nm.

2. The component according to claim 1, wherein the filter is included within the transparent or translucent element of the vehicle.

3. The component as claimed in claim 1, wherein the filter is placed on a surface of the transparent or translucent surface of the vehicle.

4. The component as claimed in claim 1, wherein the element is glass used in motor cars, buses, trains, planes, or other transport vehicles.

5. The component as claimed in claim 1, wherein the filter is transparent.

6. A therapeutic or prophylactic component for protecting eyes, comprising:
    a component comprising a filter containing a yellow pigment that absorbs wavelengths in the range 500 to 380 nm applied to one or more transparent or translucent surfaces of a vehicle.

7. The component according to claim 6, wherein the filter contains a yellow pigment usable in the transparent or translucent surface.

8. The component according to claim 6, wherein a plurality of components are applied to a plurality of transparent or translucent surfaces of a vehicle.

9. The component according to claim 6, wherein the surface is glass used in motor cars, buses, trains, planes, or any other transport vehicles.

10. The component according to claim 6, wherein the component is transparent.

11. A method for protecting eyes against short wavelengths of light, comprising:
    creating a filter material containing a yellow pigment that absorbs wavelengths in the range 500 to 380 nm; and
    applying the filter material to one or more transparent or translucent surfaces of a vehicle.

12. The method according to claim 11, further comprising:
    applying the filter material to a filter element; and
    applying the filter element to the one or more transparent or translucent surfaces of the vehicle.

13. The method according to claim 11, wherein the one or more transparent or translucent surfaces of the vehicle is a plurality of transparent or translucent surfaces of the vehicle.

14. The method according to claim 11, wherein the one or more transparent or translucent surfaces of the vehicle is glass used in motor cars, buses, trains, planes or any other transport vehicles.

15. The method according to claim 11, wherein the filter material is transparent.

16. The method according to claim 11, wherein the they eyes have a condition selected from the group consisting of healthy eyes, pseudophakic eyes, and eyes with macular and retinal degeneration.

* * * * *